United States Patent
Smith et al.

(10) Patent No.: US 7,699,226 B2
(45) Date of Patent: Apr. 20, 2010

(54) AUTOMATIC PLAN-O-GRAM SYSTEM

(75) Inventors: Philip J. Smith, Webster, NY (US); Carolyn R. Ellinger, Rochester, NY (US); Roland R. Schindler, II, Pittsford, NY (US)

(73) Assignee: Industrial Technology Research Institute, Hsinchu (TW)

( * ) Notice: Subject to any disclaimer, the term of this patent is extended or adjusted under 35 U.S.C. 154(b) by 719 days.

(21) Appl. No.: 11/191,647

(22) Filed: Jul. 28, 2005

(65) Prior Publication Data

US 2007/0023510 A1    Feb. 1, 2007

(51) Int. Cl.
G06K 7/08       (2006.01)
G06K 15/00      (2006.01)
G06F 19/00      (2006.01)
G06Q 30/00      (2006.01)
G08B 21/00      (2006.01)
G05B 19/00      (2006.01)

(52) U.S. Cl. .................. 235/451; 235/383; 235/385; 340/5.91; 340/5.92; 340/691.6

(58) Field of Classification Search ............... 235/451; 705/22; 340/5.91, 5.92, 691.6
See application file for complete search history.

(56) References Cited

U.S. PATENT DOCUMENTS

| | | | |
|---|---|---|---|
| 4,126,854 A | 11/1978 | Sheridon | |
| 4,673,932 A | 6/1987 | Ekchian et al. | |
| 4,724,427 A | 2/1988 | Carroll | |
| 5,383,111 A | 1/1995 | Homma et al. | |
| 5,528,272 A | 6/1996 | Quinn et al. | |
| 5,798,693 A | 8/1998 | Engellenner | |
| 5,995,019 A | 11/1999 | Chieu et al. | |
| 6,019,394 A | 2/2000 | Chenoweth et al. | |
| 6,025,896 A | 2/2000 | Hattori et al. | |
| 6,055,091 A | 4/2000 | Sheridon et al. | |
| 6,147,791 A | 11/2000 | Sheridon | |
| 6,232,870 B1 | 5/2001 | Garber et al. | |
| 6,557,760 B2 | 5/2003 | Goodwin, III | |
| 6,584,449 B1 | 6/2003 | Otto | |
| 6,601,764 B1 * | 8/2003 | Goodwin, III | 235/385 |
| 6,752,277 B1 | 6/2004 | Sempliner | |
| 6,844,821 B2 * | 1/2005 | Swartzel et al. | 235/385 |
| 6,959,862 B2 * | 11/2005 | Neumark | 235/385 |

(Continued)

FOREIGN PATENT DOCUMENTS

WO    WO 97/39398    10/1997

(Continued)

*Primary Examiner*—Michael G Lee
*Assistant Examiner*—Kristy A Haupt
(74) *Attorney, Agent, or Firm*—Alston & Bird LLP

(57) ABSTRACT

An electronic plan-o-gram system and method for determining plan-o-gram data are provided. In accordance with the method, identifiers associated with each of more than one product located in at least one storage area in a storage facility are sensed and a product type and product location of each product is determined based upon the sensed identifiers. A configuration of the at least one storage area in the storage facility and a location of each product in the storage facility is determined based upon the configuration and the determined product locations. A plan-o-gram data is stored indicating the location of products in the storage facility.

17 Claims, 11 Drawing Sheets

U.S. PATENT DOCUMENTS

| | | |
|---|---|---|
| 7,152,040 B1 * | 12/2006 | Hawthorne et al. ............ 705/16 |
| 2002/0109593 A1 | 8/2002 | Swartzel et al. |
| 2002/0143635 A1 | 10/2002 | Goodwin, III |
| 2002/0147597 A1 | 10/2002 | Connors et al. |
| 2002/0147649 A1 | 10/2002 | White |
| 2003/0154141 A1 | 8/2003 | Capazario et al. |
| 2003/0182193 A1 | 9/2003 | Kawamata |
| 2003/0216969 A1 | 11/2003 | Bauer et al. |
| 2004/0073487 A1 | 4/2004 | Powell et al. |
| 2005/0021561 A1 * | 1/2005 | Noonan ................... 707/104.1 |
| 2005/0049914 A1 * | 3/2005 | Parish ......................... 705/14 |
| 2005/0137943 A1 * | 6/2005 | Holzman ..................... 705/28 |
| 2005/0149414 A1 * | 7/2005 | Schrodt et al. ................ 705/29 |
| 2008/0266092 A1 * | 10/2008 | Campero et al. ......... 340/572.1 |

FOREIGN PATENT DOCUMENTS

| | | |
|---|---|---|
| WO | WO 98/03896 | 1/1998 |
| WO | WO 98/19208 | 5/1998 |
| WO | WO 98/41898 | 9/1998 |
| WO | WO 00/65532 | 11/2000 |

* cited by examiner

| 20A | 20E | 20... |
| --- | --- | --- |
| 20B | 20F | 20... |
| 20C | 20... | 20... |
| 20D | 20... | 20N |

AUTOMATIC PLAN-O-GRAM SYSTEM

CROSS REFERENCE TO RELATED APPLICATIONS

This application is related to U.S. Ser. No. PCT/US06/28646, entitled ELECTRONIC PRODUCT IDENTIFIER SYSTEM in the names of Smith et al. filed concurrently herewith.

FIELD OF THE INVENTION

The invention relates to the field of electronic displays of the type for use in on storage shelves and other storage areas.

BACKGROUND OF THE INVENTION

Electronic shelf labels in retail store environments are well known in the art. One major disadvantage of prior systems is that they need some form of manual intervention to ensure that the electronic shelf labels are positioned at the appropriate places on the shelves. Thus, when the items on the shelf are moved for one of several reasons, e.g. store resets, promotional placement, the addition or removal of items, or seasonal changes, then there becomes a need to reconfigure the arrangement of electronic shelf labels on the shelf to exchange the electronic shelf labels to represent the required information. Furthermore, most systems that use electronic shelf labels need to affix some form of printed information over the electronic label to display the non changeable information relating to the item, such as bar code, UPC, stock location, dept, size and description.

Another limitation of existing electronic shelf labels systems is that the display systems used in electronic shelf labels have very limited functionality. In general, they are usually only capable of displaying rudimentary information, such as price and stock quantity and sometimes they are capable of presenting a limited number of specific alphabetic characters to denote words such as "sale". Further, most display systems used in electronic shelf labels are based on glass cells, which means that they are fragile and have severe limitations for size and ability to withstand the environment of a retail store.

In some retail operations that employ a retail accounting system, there is a requirement to manually count the inventory whenever a price change is executed. Thus, it is a relatively simple matter to adjust labels as a part of this manual counting process. Accordingly, the value of an automatic price update capability is severely limited. What is needed in the art therefore, is a shelf labeling system that is easily adapted to reflect changes in product configuration or in prices and that can also assist in the process of counting products when a price change is executed.

U.S. Patent Application Publication 2002/0109593 A1 (Swartzel et al) describes a product information display system that includes an electronic display tag mounted on a product shelf. The display tag includes a display screen having a display width of at least two feet. The display tag is operable to simultaneously display via the display screen at least both a first product and price message for a first product and a second product and price message for a second product which is different than the first product, the first and second product and price messages being displayed in a spaced apart manner. The product information display system can have a controller operable for communication with the tag. A database of stored plan-o-gram information including product facing set up information is provided. The tag and controller are operable in a facing set up mode in which the controller retrieves from the plan-o-gram database product facing set up information, communicates the retrieved information to the tag, and the tag displays facing set up margins on the display screen and product information between the set up margins for communicating shelf facing set up information to a user configuring or checking the product shelf. Thus, the '593 patent allows remote programming of display tags in accordance with assigned products.

The display tag of the '593 application includes an electronic display tag mounted on a product shelf, the display tag including a radio frequency (RF) transceiver means, and a controller operable for communication with the transceiver means. The controller and transceiver means are operable in a product stock check mode in which the transceiver means transmits a localized RF signal for detecting a radio frequency signal generated by a radio frequency transponder associated with a given product. The radio frequency transponder is adapted to generate an identifying signal upon receipt of the localized RF signal. Transponders of this type are well known and commonly referred to as RFID tags. The transceiver means is further operable to communicate to the controller whether or not at least one RFID tag associated with the given product was identified, the controller operable to initiate a restock check signal in the event that no RFID tag associated with the given product is identified by the tag. In certain applications, this restock check signal could be a system-generated message to an on-site or off-site person or persons via a personal pager, wireless telephone text message or email. The controller can be operable to initiate a restock check signal in the event that the number of detected RFID tags associated with the given product falls below a set threshold.

The '593 patent also describes a product information display system that includes an electronic display tag mounted on a product shelf, the display tag having an RF transceiver means. A controller is operable for communication with the RF transceiver means. The controller and RF transceiver means are operable in a targeted merchandising mode in which the controller causes the RF transceiver to transmit a localized RF signal for detecting a consumer RFID tag in an area proximate to the display tag, the tag operable to communicate detected consumer RFID tag information to the controller. The controller is operable to retrieve a targeted consumer message from a database based upon the received consumer RFID tag information and to communicate the targeted consumer message to the tag, the tag operable to display the targeted consumer message received from the controller.

The major deficiency of the '593 patent is that it relies upon the store operations personnel being familiar with the desired stock locations and stocking the shelves appropriately. Using the plan-o-gram feature described in the '593 patent, the system only has the ability to download price information to a predetermined location. However in reality, the operation of the store is such that it is not always possible or desirable to dictate the location of items from a central office. In cases where items are out of stock, it becomes difficult to place substitute items because price information would be incorrect. Also, as frequently happens, items can be moved to alternative locations for cross merchandising purposes, and it may be necessary to deviate from the plan-o-gram so that an appropriate price and other additional information is available.

There is a need for a new display and method for automatically updating product information presented by a shelf display so that the display accurately reflects the actual product that is placed on a shelf.

SUMMARY OF THE INVENTION

An electronic plan-o-gram system and method for determining plan-o-gram data are provided. In accordance with the method, identifiers associated with each of more than one product located in at least one storage area in a storage facility are sensed and a product type and product location of each product is determined based upon the sensed identifiers. A configuration of the at least one storage area in the storage facility and a location of each product in the storage facility is determined based upon the configuration and the determined product locations. A plan-o-gram data is stored indicating the location of products in the storage facility.

DETAILED DESCRIPTION OF THE INVENTION

Figure 1:
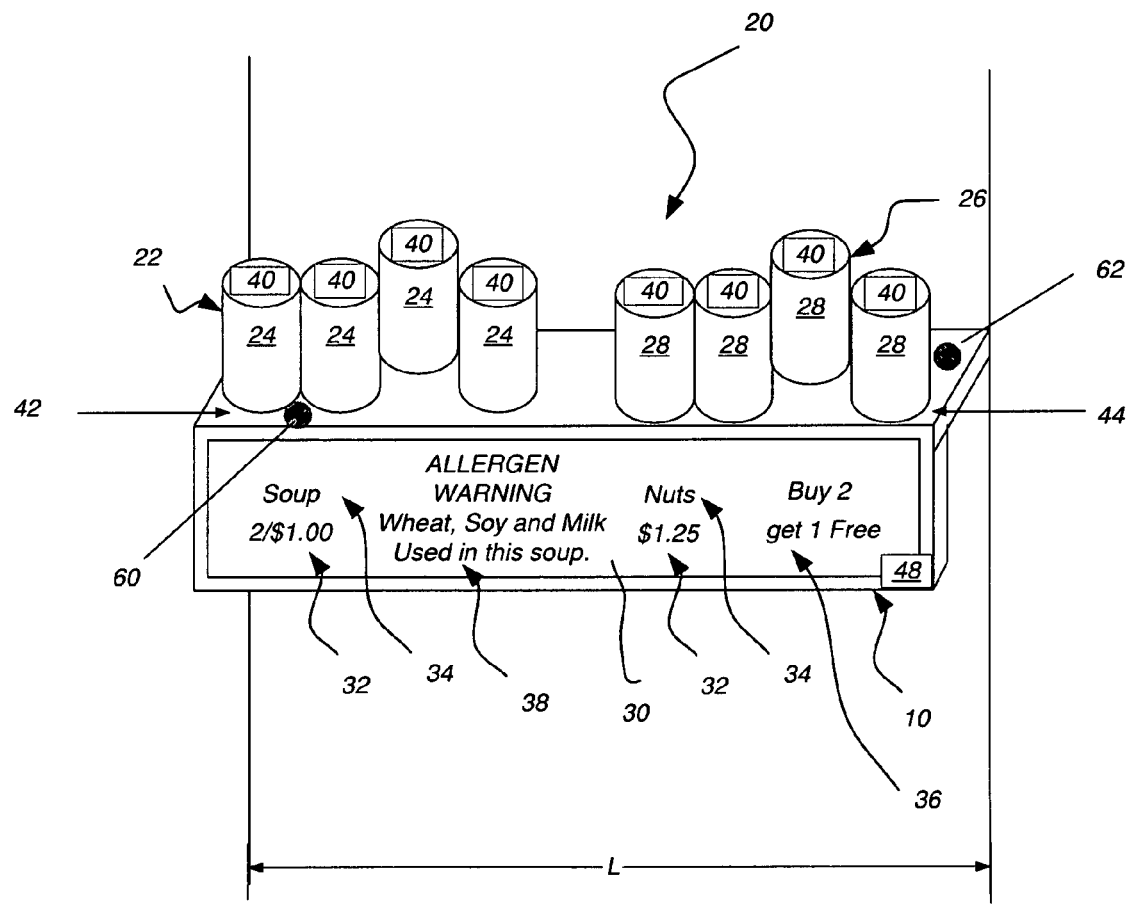
FIG. 1 depicts the system at the storage area.

FIG. 1 shows a first embodiment of an electronic product identifier system 10 of the invention that is adapted for use with a product storage area 20 adapted to store a supply of more than one type of product arranged along a length L of storage area 20 of a type used in a storage facility 21, such as a retail store, a warehouse, a pharmacy or any other storage structure. As shown, storage area 20 stores a supply 22 of a first product 24 and a supply 26 of a second product 28. In the embodiment of FIG. 1, electronic product identifier system 10 has a display 30 that has a length that extends along length L of storage area 20 and that is adapted to present product information for more than one product along the length L of storage area 20. Storage area 20 can be a horizontal shelf 29 as illustrated in FIG. 1, an end-cap kiosk, a pegboard, a clothing rack or any other device configured to store products. In the embodiment shown in FIG. 1, which illustrates storage area 20 as having a horizontal surface 29 for storing products, display 30 can be configured to extend along the full length L or a substantial portion thereof. Multiple displays 30 can be used to cover the length of a storage area 20.

Display 30 can be monochrome, bichromal, or full color. Display 30 can be segmented, or it can be pixilated, or fully addressable, to allow for greater flexibility in the types of information to be displayed. Display 30 is preferably at least 2 feet in length, preferably 4 feet and can be configured to cover the full length of an edge of shelf edge. Display 30 is configured to present product information, which can include, but is not limited to, price 32, unit price (not shown), item description 34, size (not shown), a barcode relating to the UPC (not shown), a UPC number (not shown), stocking information (not shown), product images (not shown) and marketing/promotional information 36 and product warnings 38

Figures 2, 2A:
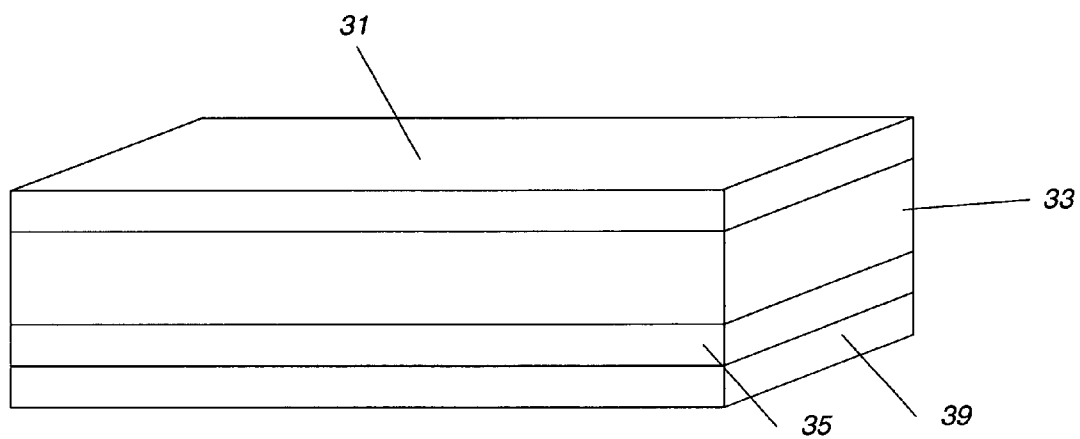
FIG. 2A shows a schematic view of one embodiment of a display.

FIG. 2 shows a more detailed sectional view of one embodiment of a display 30. In this embodiment, display 30 is of an appropriate size and shape to be placed upon an edge of storage area 20. Display 30 comprises in this embodiment a frontplane 31, an imageable layer 33, a backplane 35 and a support 39. Imageable layer 33 is made up of individual picture elements (pixels, not shown). Pixels can be grouped as desired into a plurality of facing areas 41 which are of an appropriate size to fit with a standard portion of storage area 20 used with a particular product, or pixels can be provided in a generally continuous array allowing dynamic assignment of portions of the available pixels.

Imageable layer 33 can contain an electrically imageable material. The electrically imageable material can be light emitting or light modulating. Light emitting materials can be inorganic or organic in nature. Organic light emitting diodes (OLED) or polymeric light emitting diodes (PLED) can be used. organic or polymer light emitting devices (OLEDs) or (PLEDs) can be used. OLEDS and PLEDS can comprise several layers in which one of the layers has an organic material that can be made to electroluminesce by applying a voltage across the organic material. An OLED device is typically a laminate formed on a substrate such as glass or a plastic polymer. In an OLED, a light emitting layer of a luminescent organic solid, as well as adjacent semiconductor layers, are sandwiched between an anode and a cathode. The semiconductor layers can be hole injecting and electron injecting layers. PLEDs can be considered a subspecies of OLEDs in which the luminescent organic material is a polymer. The light emitting layers may be selected from any of a multitude of light emitting organic solids, e.g., polymers that are suitably fluorescent or chemiluminescent organic compounds.

Imageable layer 33 can alternatively comprise a light modulating material that can be reflective or transmissive. Light modulating materials can be electrochemical, electrophoretic, such as Gyricon particles, electrochromic, or liquid crystals. The liquid crystalline material can be twisted nematic (TN), super-twisted nematic (STN), ferroelectric, magnetic, or chiral nematic liquid crystals. Such chiral nematic liquid crystals can be polymer dispersed liquid crystals (PDLC).

In one embodiment, the electrically imageable material used in imageable layer 33 can be addressed with an electric field and then retain its image after the electric field is removed, a property typically referred to as "bistable". Particularly suitable electrically imageable materials that exhibit "bistability" are electrochemical, electrophoretic, such as Gyricon particles, electrochromic, magnetic, or chiral nematic liquid crystals. Especially preferred are chiral nematic liquid crystals. The chiral nematic liquid crystals can be polymer dispersed liquid crystals (PDLC).

Imageable layer 33 can also be a printable, conductive ink having an arrangement of particles or microscopic containers or microcapsules. Each microcapsule contains an electrophoretic composition of a fluid, such as a dielectric or emulsion fluid, and a suspension of colored or charged particles or colloidal material. The diameter of the microcapsules typically ranges from about 30 to about 300 microns. According to one practice, the particles visually contrast with the dielectric fluid. According to another example, the electrically modulated material may include rotatable balls that can rotate to expose a different colored surface area, and which can migrate between a forward viewing position and/or a rear non-viewing position, such as gyricon. Specifically, gyricon is a material comprised of twisting rotating elements contained in liquid filled spherical cavities and embedded in an elastomer medium. The rotating elements may be made to exhibit changes in optical properties by the imposition of an external electric field. Upon application of an electric field of a given polarity, one segment of a rotating element rotates toward, and is visible by an observer of the display. Application of an electric field of opposite polarity, causes the element to rotate and expose a second, different segment to the observer. A gyricon display maintains a given configuration until an electric field is actively applied to the display assembly. Gyricon materials are disclosed in U.S. Pat. No. 6,147,791, U.S. Pat. No. 4,126,854 and U.S. Pat. No. 6,055,091, the contents of which are herein incorporated by reference.

According to one practice, the microcapsules can be filled with electrically charged white particles in a black or colored dye. Examples of electrically modulated material and methods of fabricating assemblies capable of controlling or effecting the orientation of the ink suitable for use with the present invention are set forth in International Patent Application Publication Number WO 98/41899, International Patent Application Publication Number WO 98/19208, International Patent Application Publication Number WO 98/03896, and International Patent Application Publication Number WO 98/41898, the contents of which are herein incorporated by reference.

Imageable layer 33 can also take the form of charged particles in a liquid dispersion medium encapsulated in a large number of microcapsules as disclosed in U.S. Pat. No. 6,025,896, the contents of which are incorporated herein by reference. The charged particles can have different types of color and charge polarity. For example white positively charged particles can be employed along with black negatively charged particles. The described microcapsules are disposed between a pair of electrodes, such that a desired image is formed and displayed by the material by varying the dispersion state of the charged particles. The dispersion state of the charged particles is varied through a controlled electric field applied to the electrically modulated material.

Display 30 can have a single imageable layer 33 or multiple stacked imaging layers (not shown) as desired to provide, for example, full color images. In one example, a liquid crystal material can be provided along a line perpendicular to a face of display 30, in a single layer coated on a flexible support 39. Such a structure is especially advantageous for monochrome shelf labels and the like.

Figure 2B:
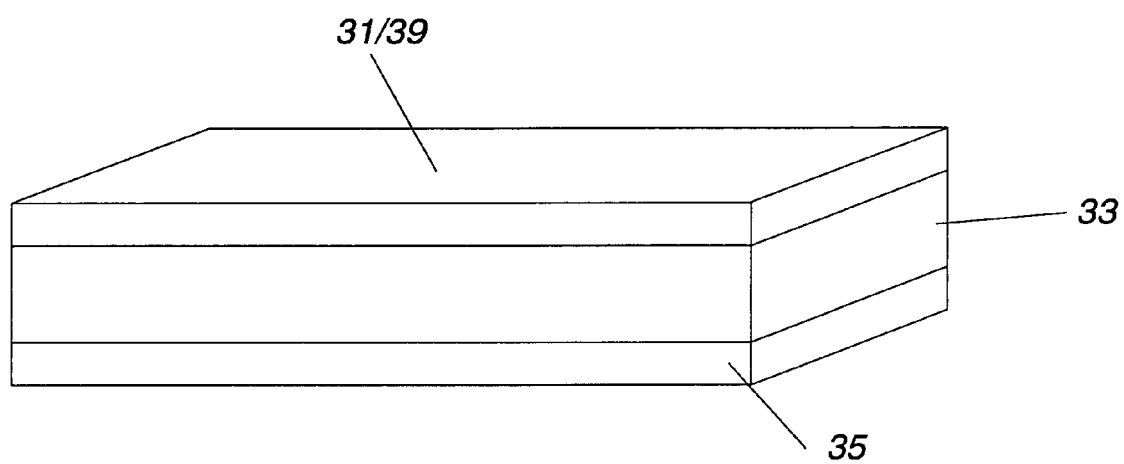
FIG. 2B shows a schematic view of another embodiment of a display.

In one embodiment of the invention, support 39 can take the form of a flexible plastic substrate. The flexible plastic support 39 can be any flexible self-supporting plastic film that supports the thin conductive film. "Plastic" means a high polymer, usually made from polymeric synthetic resins, which may be combined with other ingredients, such as curatives, fillers, reinforcing agents, colorants, and plasticizers. Plastic includes thermoplastic materials and thermosetting materials. The flexible plastic film must have sufficient thickness and mechanical integrity so as to be self-supporting, yet should not be so thick as to be rigid. Typically, flexible plastic type substrate is the thickest layer of the composite film in thickness. Consequently, support 39 determines to a large extent the mechanical and thermal stability of the fully structured composite film. Alternatively, in other embodiments, display 30 can be made using generally rigid support 39 structures such as glass, metal or ceramic substrates. As illustrated in FIG. 2B in certain embodiments, imageable layer 33 can be viewed through support 39, such as where frontplane 31 is used as support 39.

Figure 3:
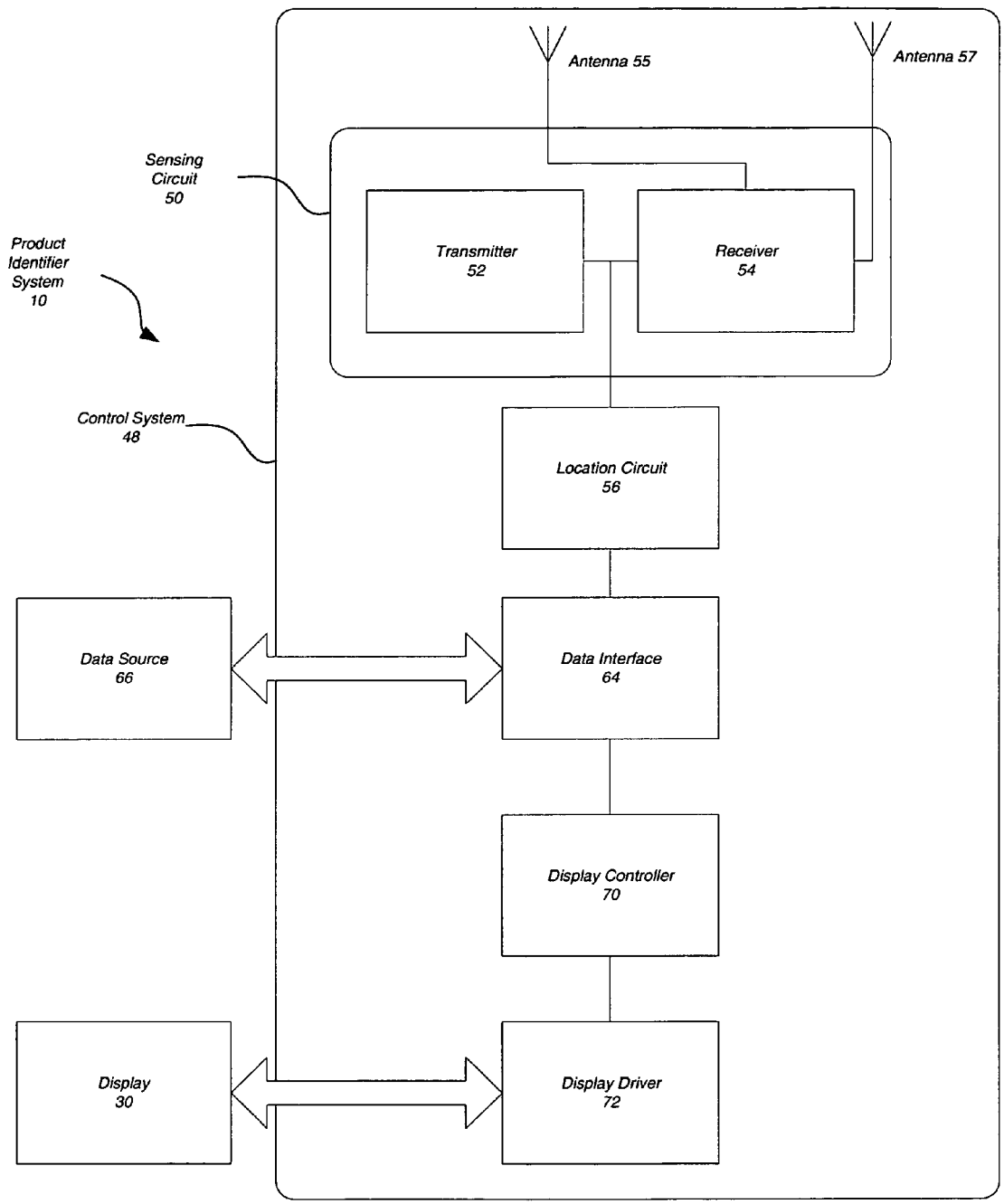
FIG. 3 shows one embodiment of an electronic product identifier system.

FIG. 3 shows display 30 connected to one embodiment of a control system 48 to form one embodiment of the electronic product identifier 10. Control system 48 is adapted to detect the type and location of products in storage area 20, to determine product information for presentation on display 30 and to cause display 30 to present the product information. In the embodiment of FIG. 3, control system 48 has an electromagnetic sensing circuit 50 that is used to exchange data with electronic product identifiers 40. Electromagnetic sensing circuit 50 has at least one transmitter 52 for transmitting polling electromagnetic fields into storage area 20 proximate to portions 42 and 44 of storage area 20 in which are products 24 or 26 are stored so that at least one electronic product identifier 40 associated with products 24 and 28 in storage area 20 can generate a response.

Each electronic product identifier 40 is adapted to receive the polling signal and to generate a responsive electromagnetic signal containing information from which at least the product type of the product can be determined.

Product identifier 40 can be formed integrally with an associated product, applied as a label to the product, or attached to a surface of the product. In the embodiment of FIG. 1 each product identifier 40 comprises a Radio Frequency Identification (RFID) transponder. Such an RFID transponder conventionally comprises three components, a memory, a transceiver and an antenna (not shown). Often these components are combined on a single substrate such as is done with RFID transponders of an inlay type. Such RFID transponders are typically adapted to receive the polling electromagnetic fields and to generate a responsive signal. Such RFID transponders are typically associated with an identification code that identifies each transponder within a system or that identifies a specific transponder as being one of a type common to a product, process, or purpose. For example, when an RFID transponder is used to identify products in a retail environment, it is often the case that the central purpose of such a transponder is to identify each product type to a retailer, however, it is not inherently necessary in such an embodiment to uniquely identify each transponder, instead, it is only necessary that the RFID transponder provide a response that enables a reader to discriminate between individual product types, known generally in the industry as SKUs.

When RFID transponders of this type are used as product identifiers 40 in a retail environment, this identification code is transmitted automatically in each responsive signal. Examples of transponders that can be used for such a purpose include, but are not limited to, Carroll, U.S. Pat. No. 4,724,427 and Moskowitz et al., U.S. Pat. No. 5,528,272.

Such RFID transponders are becoming increasingly popular with retailers as they enable automatic, non-contact, non-line of sight control over retail inventory resulting in the elimination of the labor associated with inventory counting and price updating. This allows labor at the retailer to be deployed to more valuable customer service functions. Further, such RFID transponders can be used to facilitate purchase transactions and to resolve warranty problems.

The electromagnetic sensing circuit 50 further comprises at least one receiver 54 for receiving each responsive electromagnetic signal at two separated sensing locations shown in FIG. 1 as locations 60 and 62. In certain embodiments, transmitter 52 and receiver 54 can share components in a transceiver type arrangement.

The ability to sense responsive signals at two or more separated sensing locations can be provided in a variety of ways. In the embodiment illustrated in FIG. 3, receiver 54 is associated with two separated antennas 55 and 57 that are positioned at separate locations 60 and 62 so that they can separately receive each responsive signal. In such an embodiment, receiver 54 provides an output signal that is characteristic of the identifying information contained in the responsive signal and that also is characteristic of differences between the responsive signals. Alternatively, sensing circuit 50 can employ a receiver 54 that can generate two output signals, each signal being characteristic of the responsive signals received at locations 60 and 62 respectively. In still another embodiment (not shown), sensing circuit 50 can incorporate separate receiver circuits associated with separate antennas for receiving responsive signals at separate locations 60 and 62 and, for providing separate output signals that are characteristic of the identification code in the responsive signal and from which differences in the responsive signals can be determined. The number of sensing locations should be great enough to enable the determination of product placement at a spatial resolution that is appropriate to the number of items stored per unit area and the relative location of each. Some items such as spices or lipstick typically have very small facings in a store and therefore many different product types can be stored per unit of area in storage area 20. In such circumstances, more sensing locations can be necessary. However larger items, such as for example, laundry detergent, or bulk items, each occupy such a substantial amount of the available space in storage area 20 so as to make discrimination of the location of such items within the storage area 20 possible using as few as two separated sensing locations.

A location circuit 56 is provided for determining a location in storage area 20 of each responsive electronic product identifier 40 using the signals received from receiver 54. Location circuit 56 can take the form of a programmable processor such as a micro-processor, a micro-controller, an application specific integrated circuit or an arrangement of discrete components. In any form, location circuit 56 is adapted to use differences in the responsive signals received at different points and to determine a location for each product identifier 40 in storage area 20 based upon differences in the signals. For example, location circuit 56 can correlate the signal strength received at each of sensing locations 60 and 62. Location circuit 56 can be provided with algorithms to determine if the quantity of product detected is sufficient to require a product label be displayed. Additionally, location circuit 56 or other circuits and systems in control system 48 can be adapted to determine if a located product is to be identified as misplaced, flagged for restocking, or flagged with other user defined alert(s). The user of the system, in accordance with local laws governing product identification, can predetermine the system requirements.

A data interface 64 is adapted to determine product information for each product type detected. In the embodiment illustrated, data interface 64 is adapted to determine the product information by compiling the identifying information contained in the responsive signals from receiver 54 and generating a request for product information from a data source 66. Data source 66 can be located proximate to storage area 20 or it can be remote.

Data source 66 is adapted to receive a signal from data interface 64 containing the identification code read from each product type and to generate a responsive signal containing one or more of the following types of product information for each product type: Price, Unit Price, Item description, size, the barcode relating to the UPC, UPC number, stocking information and product images and marketing/promotional information and warnings and any other information that the user of the system desires. Data interface 64 receives a responsive signal and provides the product information and location information, in this embodiment, to a display controller 70.

In the embodiment of FIG. 1, electronic product identifier system 10 is shown with a data source 66 that is separate from control system 48. In such an embodiment, data source 66 can comprise a memory that stores product information such as a data storage device including, but not limited to, a disk drive, semiconductor memory, server, personal computer, or the like. Communication with such a remote data source 66 can be made by way of transmitter 52 and receiver 54, or by way of a communication device (not shown) such as a modem or other conventional communication circuit or system that is adapted to exchange data between data interface 64 and data source 66 by way of a wired network, wireless network, or via an intermediate computer system.

Display controller 70 is adapted to cause product information for each product type to be presented in an area of display 30 that is proximate to locations at which the supply of products of that type have been located. As noted above the product information that is displayed can contain Price, Unit Price, Item description, size, the barcode relating to the UPC, UPC number, stocking information, product images or marketing/promotional information or other multi-media content as obtained from the data interface.

Display controller 70 is adapted to determine a location for presenting product information relevant to each product type by using location information from location circuit 56 to segregate display 30 into portions with one portion being associated with each product type. In one embodiment, the display portions can be differently sized with portions arranged in proportion to the portion of storage area 20 actually occupied by each product type. Such proportions can be dynamically adjusted based upon patterns of placement or removal of products in storage area 20.

In another embodiment, display controller 70 is adapted to segregate display 30 into facing areas each facing area being associated with a predetermined portion of storage area 20 that is capable of storing at least one supply of one of a plurality of products in a manner that allows product and the display to be viewed simultaneously from outside the storage area. This can be done in a manner that is consistent with non-active shelf displays so that, for example, a supply of cans of soup can be arranged in a portion of a shelf and the display 30 can present product information regarding the soup in an area of the display that is visually aligned with the portion of the shelf that contains the supply of soup.

In this embodiment, the display controller 70 can be adapted to proportionately attribute a plurality of facing areas to each product in proportion to the portion of the storage area actually occupied by each product type. In one embodiment, display controller 70 can be further adapted to detect when product information for at least one product type is organized into more than one facing area. When display controller 70 detects such a situation, display controller 70 can cause a minimum set of product information to be presented in one facing area proximate to the location of the products stored in that portion of the storage area and can cause supplemental product information to be presented in another one of the facing areas. Such a minimum set of product information can comprise, for example, a product description and price while such supplemental information can include any other type of product information. The number of facing areas can be adjusted to reflect the removal of or placement of products in storage area 20.

Display controller 70 can be preprogrammed to expect that a predetermined set of product types will be stored in storage area 20 and, where this is done, display controller 70 can segregate display 30 into facing areas for each of the predetermined product types and can present product information for each product type. Where there is no supply of products of one of the predetermined product types, display controller 70 can provide an indication that such a product is out of stock. Similarly where products that are not among the predetermined set of product types are located in the storage area, display controller 70 can present product information for such products or can provide a warning indicating that such products have been mis-stocked.

As illustrated in FIGS. 1 and 3, display controller 70 generates signals that are received by display driver 72 and converted by display driver 72 into signals that are provided to imageable layer 33 to alter the appearance of display 30. There are a variety of well-known circuits and systems that can be used for this purpose.

It will be appreciated that using a system of this type, it is possible to ensure that each storage area 20 has product information presented in association therewith that provides a reliable indication of what is stored in the storage area and where the item is stored. It will also be appreciated that product information can be rapidly and automatically updated with new information simply by altering the product information stored in data source 66.

Using an electronic product identifier system 10 of the invention also enables real time adjustment of the information presented on display 30 so that storage area 20 can be effectively maintained allowing greater utilization of resources. The advantages of this system over those previously described are that it allows for a more complete automation of the price update function. For traditional horizontal shelves the display, which now comprises the full length of the shelf and height of the shelf edge, allows for the required information to be present directly underneath the desired items. Where display 30 is of fully addressable nature, display 30 can fulfill the needs of both the store operations for the display of correctly updated legally required information such as price and unit price and product description, in addition to fulfilling, more completely, the needs of the marketing functions of the store such as to identify promotions and items of special interest. In this embodiment, the image forming resolution of the display 30 can be such that it could display barcodes, images and the like. Display 30 is comprised of a polymeric based support 39 rather than glass so that it is more able to withstand the harsh environments of the store operations, and be an integral part of the store design rather than being mounted to the shelves with awkward, unsightly and potentially dangerous or damageable brackets.

Figure 4:
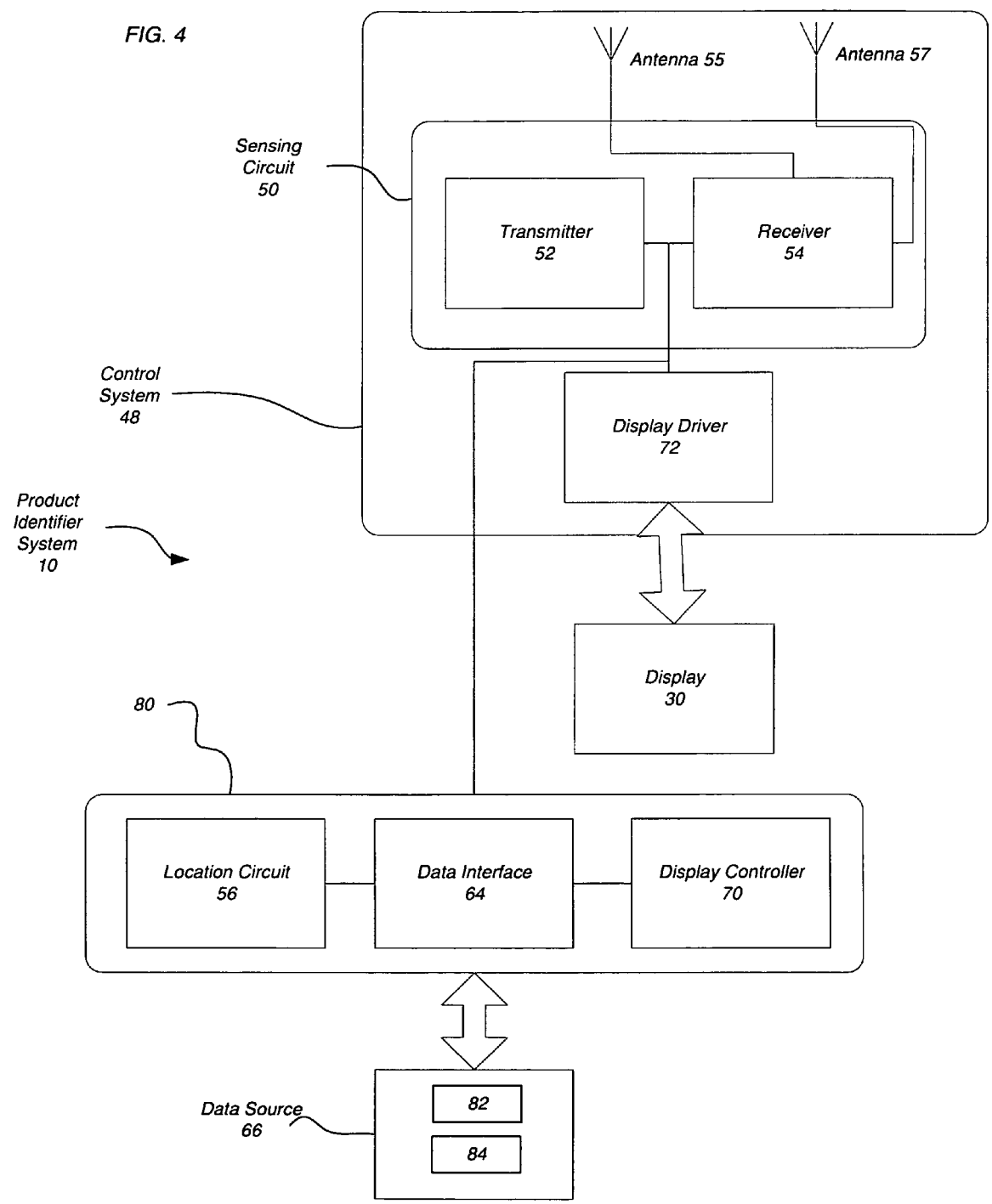
FIG. 4 shows another embodiment of an electronic product identifier system.

FIG. 4 shows an alternative embodiment of electronic product identifier 10 having a different control system 48. In this embodiment, a local processor 80 is associated with control system 48 that can be physically located at storage area 20 or separate. Local processor 80 is adapted to perform the functions of location circuit 56, data interface 64 and display controller 70. Each local processor 80 can perform these functions for one combination of a display 30 and control system 48 or for a number of additional combinations of a display 30 and control system 48 (not shown) with each additional combination being associated with storage areas (not shown) that are proximate to storage area 20 such as may be found in a storage facility, such as a retail environment where stacked shelves provide a plurality of proximate storage areas. In such an application, the overall cost of an electronic product identifier system 10 can be reduced by the use of a local processor 80 as it is no longer necessary to provide components for performing such functions separately at each storage area 20.

Local processor 80, control circuit 48 and display 30 can be powered by being electrically connected to a local electrical circuit or can be powered by an appropriately sized battery, fuel cell or other source of energy. Local processor 80 can connect to control circuit 48 using a wired or wireless communication regime. Processor 80 can connect to data source 66 using a wired or wireless strategy as well.

Figure 5:
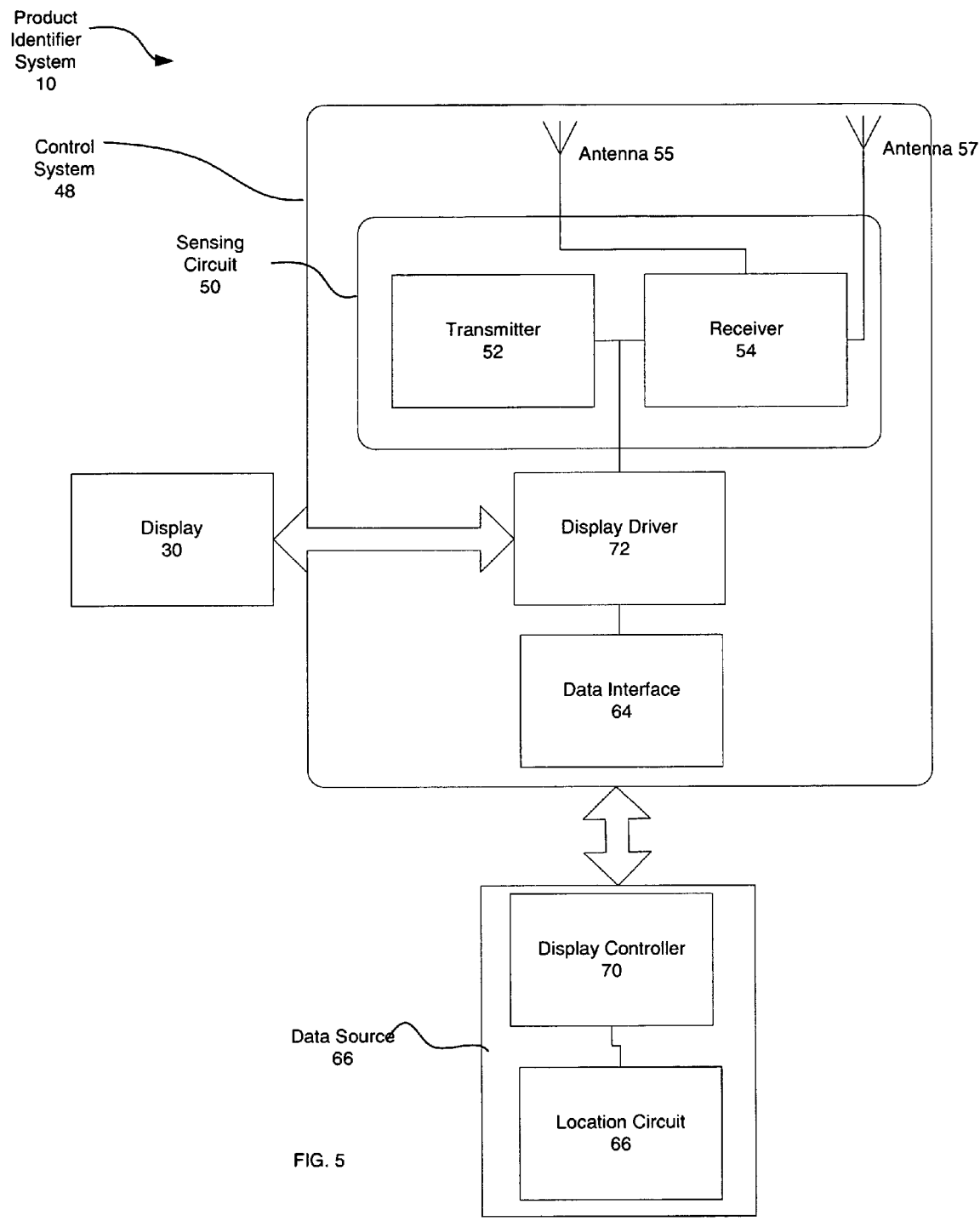
FIG. 5 shows still another embodiment of an electronic product identifier system.

FIG. 5 shows still another embodiment of a control system 48 of the invention, in this embodiment, control system 48 is adapted to communicate with an embodiment of data source 66 that is also adapted to provide the functions of location circuit 56 and display controller 70. This has the advantage of reducing the overall complexity and cost of the system.

Figure 6:
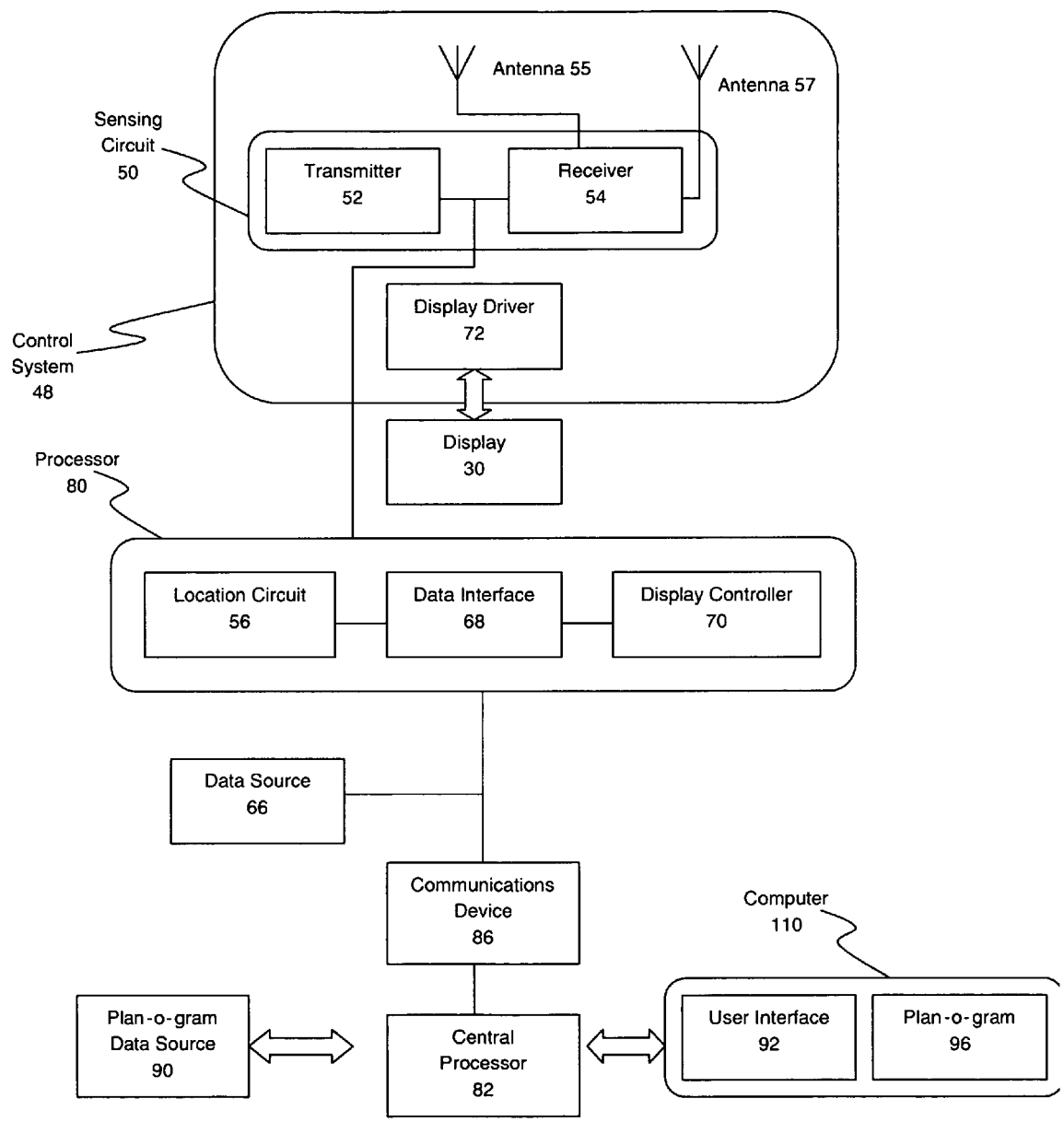
FIG. 6 shows one embodiment of the electronic product identifier system used for forming a plan-o-gram.

Turning now to FIG. 6, what is shown is one embodiment of one electronic plan-o-gram system 12. The electronic product plan-o-gram 12 of the present invention allows for automatic plan-o-gram generation giving the user an accurate representation of the actual location of products in a storage facility at any given time based upon signals received from electronic product identifiers 40 associated with the products.

As shown in FIG. 6, electronic plan-o-gram system 12 uses the embodiment of the electronic product identifier system 10 described above with reference to FIG. 4 as a part of a comprehensive system for generating plan-o-grams and otherwise managing inventory and product information display. However, other embodiments of product identifier system 10 can be used with equal facility and it will be appreciated that in this embodiment the structure, functions and operative relationships of display 30, transmitter 52, receiver 42, antennas 55 and 57, sensing circuit 50, data interface 64, location circuit 56, display controller 70, and display driver 72 can be well understood from the above descriptions.

In this embodiment, the overall cost of the system can be reduced by the use of elements such as a processor 80 for multiple tasks. Local processor 80 can connect to sensing circuit 50 using a wired or wireless communication regime. Local processor 80 can connect to data source 66 using a wired or wireless strategy as well. In the embodiment illustrated in FIG. 6, data source 66 is in two-way communications with processor 80. In this embodiment, data source 66 has data stored therein comprising a storage area ID for each storage area in a storage facility and also has data stored therein indicating the product type and location of each product in each storage area. In addition, data source 66 contains one or more of the following types of product information for each product: Price, Unit Price, Item description, size, the barcode relating to the UPC, UPC number, stocking information and product images and marketing/promotional information and warnings and any other information that the user of the system desires. In this embodiment, the associated product storage area ID, product type and location information are uploaded to data source 66 by, for example, a local processor 80 via a wireless communication link. The information can be transferred to data source 66 automatically based on a timing mechanism, or may be initiated upon request from the processor 80 or central processor 82.

A plan-o-gram data source 90 provides a configuration of each storage area 20 that links each storage area 20 with particular locations within a storage facility 21. Plan-o-gram data source 90 can be a single data file or a database for a single retail or warehouse establishment. Alternatively, plano-gram data source 90 can be in the form of multiple files, or one or more databases containing information for multiple physical locations; for example multiple stores within a larger chain. FIG. 6 shows plan-o-gram data source 90 to be separate from central processor 82. In an alternative embodiment, plan-o-gram data source 90 may be stored within the central processor 82. Plan-o-gram data source 90 can comprise data stored on a electronic media such as CD, DVD, or flash drive or may be stored on a dedicated server, website, or other remote data storage location coupled with circuits and systems for reading such data and providing it as required.

Plan-o-gram data source 90 can also have data stored therein that assigns particular product types for storage at particular storage areas 20 within a storage facility 21 or that further assigns particular product types for storage at particular locations within a storage area 20. This is done to ensure that the storage areas 20 provide desired mixes or product types and desired quantities of product types within storage facility 21.

In the embodiment shown in FIG. 6, a communication device 86 is adapted to transfer information between data source 66 and central processor 82. Communication device 86 shown in FIG. 6 is the central processor 82, can use any known method of communication including, but not limited to, Internet, bluetooth, wired or wireless connections.

A plan-o-gram 96 is typically stored in the form of electronic data indicates the location of products in the storage area of a storage facility 21. Often this takes the form of a map that illustrates product positioning within a portion of an arrangement of storage areas 20 within a shelving unit or other facility within a warehouse or retail establishment. The specification of the information and format of the plan-o-gram may be fixed, pre-user defined, or interactive. Plan-o-grams can be generated for multiple sections, a complete store, or multiple stores. Typically, plan-o-grams provide some indication of the configuration of storage areas for a desired storage facility 21 and product information indicating which portions of the illustrated storage areas are assigned for particular products. However, using the system described herein, plan-o-gram 96 can also be made to illustrate the actual location of products and their associated information for a given store, or portion thereof.

A user interface 92 is adapted to allow a user to obtain a plan-o-gram 96 for all or a portion of the retail or warehouse space. User interface 92 may allow the user to define all or some of the specifics of the plan-o-gram. User interface 92 may also contain a predefined selection or give a user total freedom to define product assignments within the storage spaces 20 associated with a plan-o-gram. User interface 92 is in communication with central processor 82 through any means known in the art including Internet, bluetooth, wired or wireless connections.

Central processor 82 is provided with algorithms to use configuration data and product information and product location information received from data source 66 to automatically create a plan-o-gram. Central processor 82 further associates the information from data source 80 and plan-o-gram data source 90, formats the information, and supplies the plan-o-gram to user interface 92. The central processor 82 can be a desktop computer, mainframe, server, laptop, handheld processor or any other processing system.

User interface 92 can be a software program useable on a personal computer or laptop 110 as illustrated in FIG. 6. In another embodiment, user interface 92 can be a kiosk or other stand-alone type equipment. Plan-o-gram 96 can be electronically displayed to a user through the user interface, selectively printed, or automatically printed and can, optionally, be stored in a memory of such computer 110.

Figure 7:
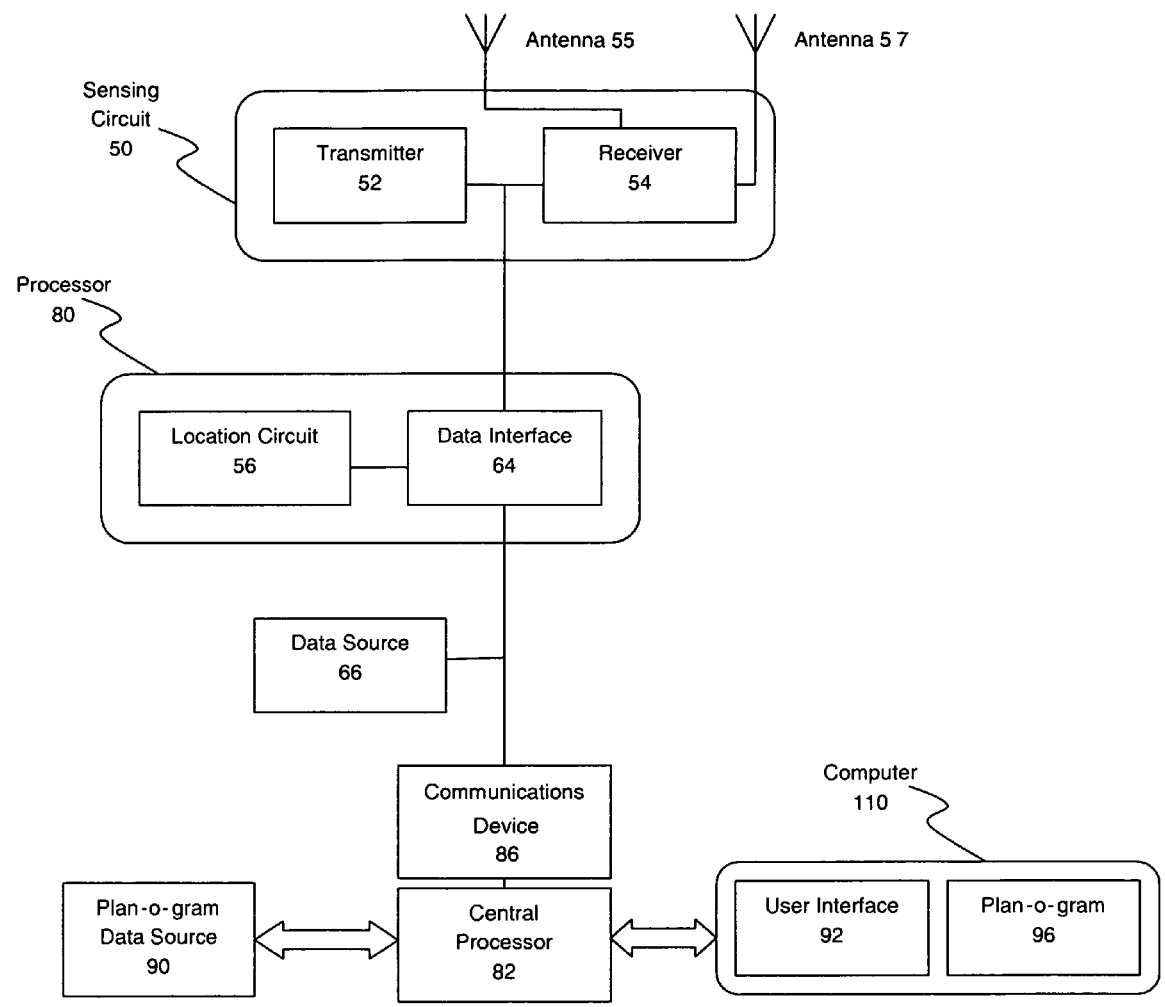
FIG. 7 shows one embodiment of the electronic plan-o-gram in combination with the electronic product identifier system.

FIG. 7 shows an embodiment of the electronic plan-o-gram system using various components of the electronic product identifier system 10 shown above but without a display 30, display controller 70 and display driver 72. In this configuration, local processor 80 is adapted to perform the functions of location circuit 56 and data interface 64 only. As noted above, each local processor 80 can perform these functions for one or more storage areas, such as may be found in a retail environment where stacked shelves provide a plurality of storage areas.

The advantage of this system over those previously described is that it, returns an accurate representation of the actual product placement within storage areas 20 of a storage facility 21 at less cost than embodiments that also include display related components of electronic product identifiers 10.

The capabilities of the system 12 of FIG. 7 would allow central processor 82 to identify the location of stock, in addition to providing a real time count of the inventory present at each location. The central processor 82 could compile the product layout by sector or for an entire retail establishment in real time. The ability of the system to identify the location of misplaced or low-quantity stock would allow a user to setup automated instructions for product reshelving and restocking to be transmitted to staff on the floor. Additionally, it can be envisioned that the system of this invention could be used for wholesale or warehouse applications. This could allow the user to compare the intended plan with the actual layout and for verification of sales versus plan-o-gram.

Figure 8:
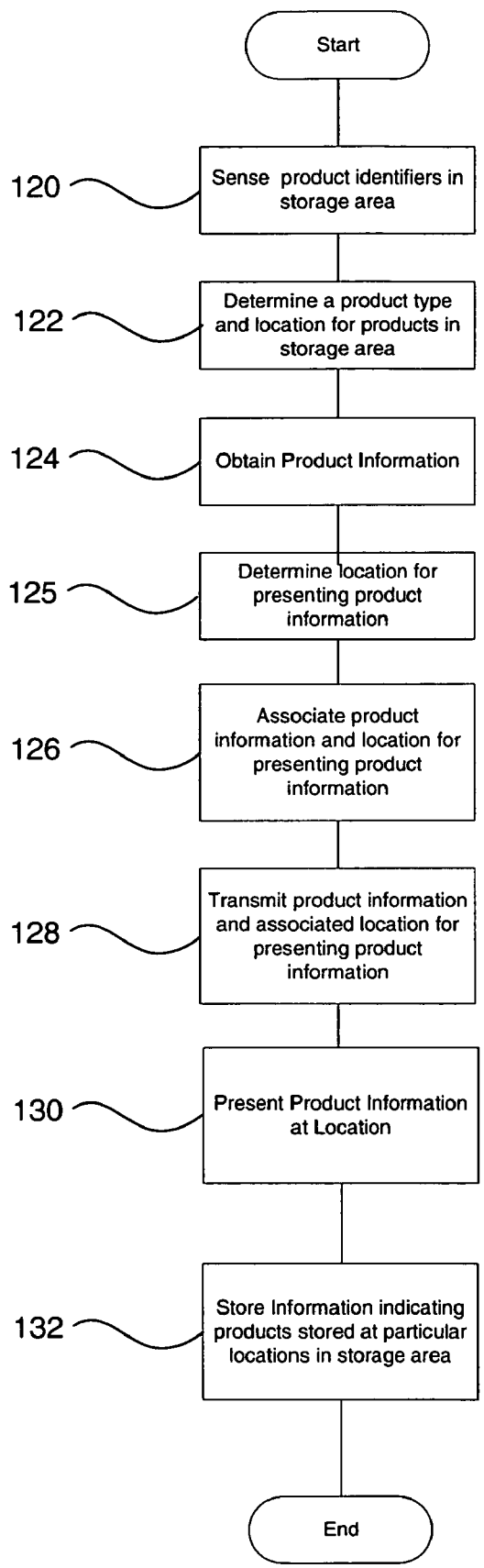
FIG. 8 shows a flow diagram of a method for updating the display.

FIG. 8 shows a flow diagram depicting a method for using the system of FIG. 6 to ensure that an electronic product identifier provides up to date product information for products that are stored in a storage area 20 associated therewith.

As shown in FIG. 8, product identifiers in storage area 20 are sensed (step 120). This can be done in a variety of ways as generally described above. In the embodiment of FIG. 6, control system 48 performs the sensing step by causing transmitter 52 to send out polling signals and receiver 54 to receive responsive signals from each product identifier 40 in storage area 20. Product information and location information are derived by receiver 54 and location circuit 56 from the responsive signals and provided to data interface 64. Data interface 64 then provides this information to data source 66. In the embodiment of FIG. 6, data source 66 is shown in communication with a central processor 82. In an alternative embodiment (not shown), data source 66 and central processor 82 can be combined in the same device some illustrative examples of which include but are not limited to a personal computer, server, or mainframe computing system.

Sensing step (step 120) can performed at the request of a local processor 80 or at the request of a central processor 82 that is setup to periodically request information from the sensing circuit 50. In an alternate embodiment, control circuit 48, can be setup so that sensing circuit 50 periodically performs the sensing step (step 120).

Product type information and location information are then determined based upon the signals received (step 122). The product type information can be determined by local processor 80 as described above. Similarly, the product location information can be determined using location circuit 56 as described above. In another embodiment, (not shown) the received signals are first transmitted to central processor 82 by way of data interface 64 with central processor 82 being adapted to determine the product type information and location information based upon the signals so received.

Product information is then obtained based upon the product type information (step 124). The product information can be obtained from data source 66 as described above.

A location for presenting the product information is then determined (step 125). This can be one in at least two ways, in one embodiment, local processor 80 is also provided with an location circuit 56 that has an algorithm that uses the relative signal strengths obtained from the sensing circuit 50 associated with storage area 20 to determine location information for locating product identifiers within storage area 20. The determined location information can be used by display controller 70 to determine which portions of display 30 are to be used for presenting product information. In another embodiment, the location for presenting particular product information can be to portions of a display 30 that are proximate to the predefined portion of a corresponding storage area 20 assigned to the storage of the products as defined by a plan-o-gram 96. In this latter embodiment, the product type information and product location information can be used for other purposes such as determining a quantity of stock of a supply of the product in storage area 20. In still another embodiment, central processor 82 can be used to determine locations for presenting product information. Where applicable, local processor 80 or central processor 82 further can be provided with algorithms to determine which display controller 70 from among many possible display controllers is associated with a location for presenting the product information location and to that send information to be displayed on a display 30.

The product information and location information are associated such as in a data file or data field (step 126) and sent for presentation (step 128). In the embodiment of FIG. 6, these steps are performed by local processor 80 and/or central processor 82 which assembles the data and to transmit it to data interface 64 which can be done directly or by way of data source 66.

The product information is then presented on the portion of the display indicated by the associated location information (step 130). In the embodiment of FIG. 6, the product information and location information are received by data interface 64 and provided to display controller 70. Display controller 70 in turn, processes these signals and provides signals to display driver 72 that display driver 72 uses to write product information to the portion of a display 30 indicated by the location information. In addition to these functions, local processor 80 and/or display driver 82 can transmit location data determined for a given product identifier 40 for storage in data source 66 (step 132).

Figure 9:
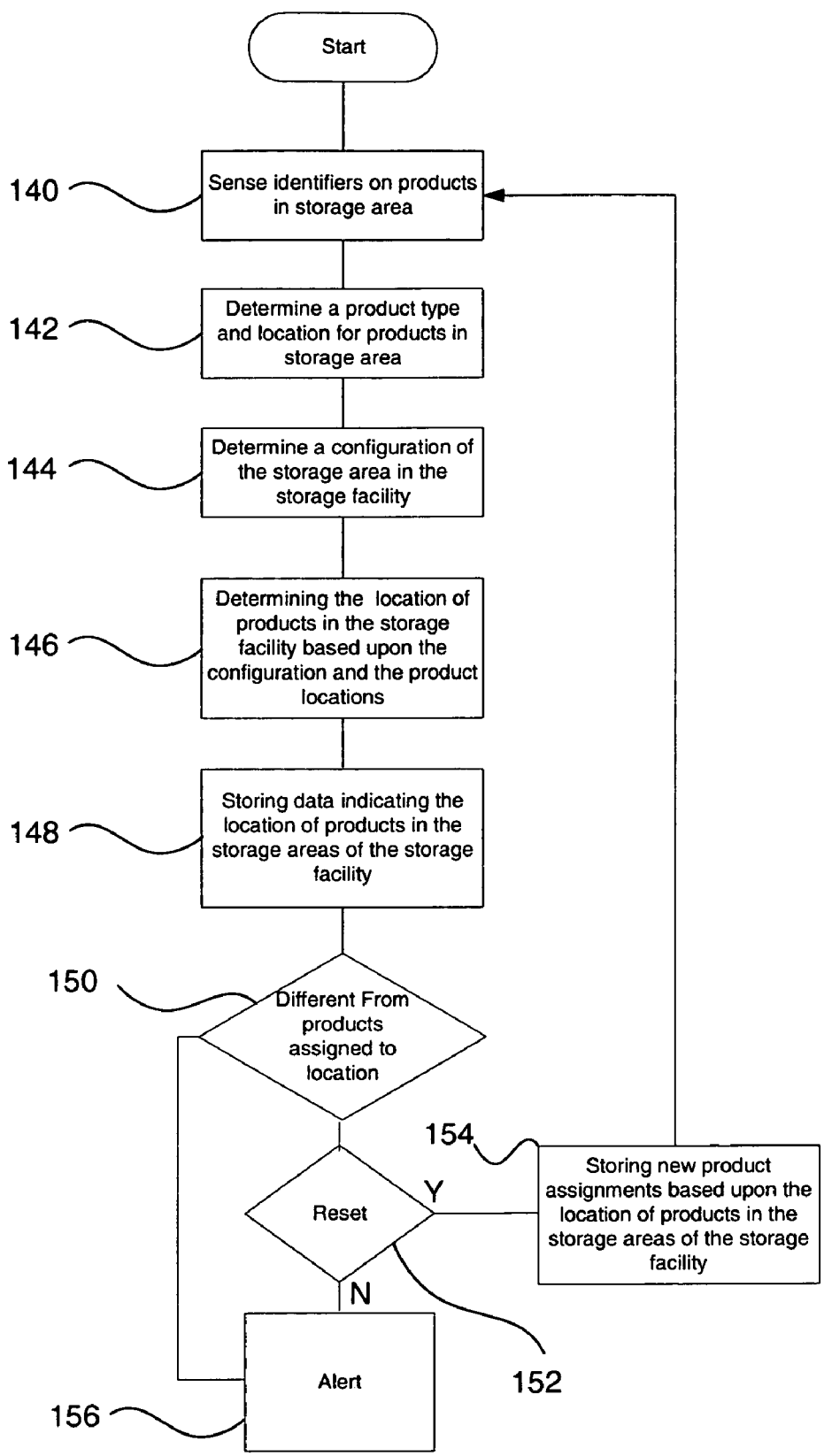
FIG. 9 shows a flow diagram of a method for generating a plan-o-gram.
Figure 10:
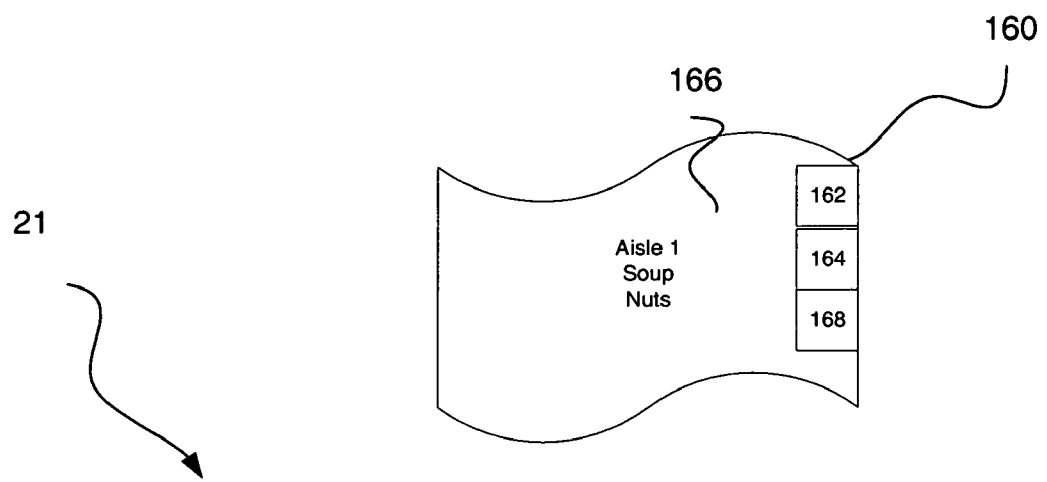
FIG. 10 shows one example of a storage facility having a plurality of storage areas.

FIG. 9 shows a flow diagram for generating a plan-o-gram of a storage facility 21 illustrated in FIG. 10 using the product identifier system 10 of FIG. 6.

As is shown in FIGS. 9 and 10, in accordance with a method of FIG. 9, identifiers 40 on products in storage areas 20*a*-20*n* are sensed. This is done as described above by transmitting polling signals into storage area 20 and receiving responsive signals from identifiers 40 on products within a storage facility 21 (step 140). Product type and product location information are determined for each product based upon the received signals (step 142). This step can be performed as described above. A configuration of storage areas and sensing locations in the storage facility is then determined (step 144). The configuration can, for example, comprise data stored previously in a plan-o-gram data source 90 as described above or in data source 66. Alternatively, the configuration data can be determined automatically by providing sensors (not shown) in storage facility 21 that are adapted to sense the location of product identifier systems 10 such as by radio-location of the sensors and interpretation of data transmitted thereby.

The location of products within the storage facility 21 is then determined (step 146). Using location information that indicates where particular products are located in a particular storage area, e.g. storage area 20A with information from the configuration data locating storage area 20A within storage facility 21. This determination can be made by local processor 80 and/or central processor 82.

The data that indicates the actual location of products in the storage areas 20A-20N of storage facility 21 is then stored (step 148). The actual location data can be stored in the form of a data file or any other data structure known in the art. The actual location data can be stored in plan-o-gram data source 90 or in data source 66.

The actual location data can be used for variety of purposes. In the embodiment of FIG. 9, a comparison step (step 150) is performed after storage to determine whether the products that are actually located in storage areas within storage facility 21 correspond to products that are assigned for storage at those locations in a plan-o-gram data file stored in plan-o-gram data source 90. As is illustrated in FIG. 9, where no differences are detected, the process can return to the step of receiving signals from identifiers on products in storage areas within storage facility 21 (step 140).

As is also illustrated in FIG. 9, where differences are detected a step of detecting whether a reset requested has been made can be performed (step 152). When a reset is requested actual location data is stored in the form of plan-o-gram data so that the plan-o-gram data reflects actual conditions at the time of the reset (step 154). Using the system, therefore, reset can be performed simply by manually adjusting shelf the arrangement of products on storage areas of a storage facility and transmitting a reset request. This greatly facilitates the speed at which reset can be performed and provides central processor 82 and/or any other user of plan-o-gram data source 90 with an indication of an actual arrangement products made at the retail level.

Where differences are detected and where no reset has been requested, an alert, warning, or other signal can be provided to indicate when circumstances exist such that products that are actually located in a particular location in a storage area 20*a*-20*n* does not correspond to a product type that is expected to be found at that location (step 156). Such a signal can cause a warning to be presented on a display 30 of a product information system.

As is also shown in FIG. 10, where a plurality of storage areas are arranged in a storage facility a group display 160 can be provided at a location proximate to but separated from a group of the storage areas. The group display 160 has a group display receiver 162 for receiving signals from central processor 82 and a group display driver 164 for causing a display surface 166 to present group display information provided by central processor 82. Central processor 82 can provide the group display information based upon the product information and location information received from each electromagnetic sensing circuit. Further, central processor 82 can be adapted to determine product groupings based upon the product information associated with storage areas proximate to, but separate from, the group display and to provide group display information indicating each determined product grouping. For example where a group of products types include various types of soup, presented group display information can include "soup" without identifying each type of soup with specificity.

In another embodiment of this type, group display 160 can have a group display receiver 162 for receiving transmitted signals having product information and location information and a group display processor 168 for determining group display information based upon the product information and location information. In this embodiment, a group display processor 168 generates signals causing the group display driver 164 to present the determined of group display information on a display surface 166 without the aid of central processor 82, by determining group display information locally.

The invention has been described in detail with particular reference to certain preferred embodiments thereof, but it will be understood that variations and modifications can be effected within the spirit and scope of the invention.

PARTS LIST 10 electronic product identifier system
12 electronic plan-o-gram system
20 product storage area
21 storage facility
22 supply of first product
24 first product
26 supply of second product
28 second product
29 horizontal shelf
30 display
31 front plane of display
32 price
33 imageable layer
34 item description
35 backplane
36 marketing/promotional information
38 product warnings
39 support
40 product identifier
41 facing area
42 portion of storage area
44 portion of storage area
48 control system
50 electromagnetic sensing circuit
52 transmitter
54 receiver
55 antenna
56 location circuit
57 antenna
60 sensing location
62 sensing location
64 data interface
66 data source
70 display controller
72 display driver
80 local processor
82 central processor
84 antenna system
86 communications device
90 plan-o-gram data source
92 user interface
96 plan-o-gram
100 point of sale system (POS)
110 computer
step 120 sense product identifiers in storage area
step 122 determine a product type and location for products in storage area
step 124 obtain product information
step 126 determine location for presenting product information
step 126 associate product information and location for presenting product information
step 128 transmit product information and associated location for presenting product information
step 130 present product information at location
step 132 store information indicating products stored at particular locations in storage area
step 140 sense identifiers on products in storage area
step 142 determine a product type and location for products in storage area
step 144 determine a configuration of the storage area in the storage facility
step 146 determining the location of products in the storage facility based upon the configuration and the product locations
step 148 storing data indicating the location of products in the storage areas of the storage facility
step 150 different from products assigned to location
step 152 reset
step 154 storing new product assignments based upon the location of products in the storage areas of the storage facility
step 156 alert
160 group display
162 group display receiver
164 group display driver
166 group display surface
168 group display processor

The invention claimed is:

1. An electronic plan-o-gram system comprising:
at least one product storage area capable of storing more than one type of product; a plurality of electronic product identifiers, with one such electronic product identifier associated with each one of a supply of products of each product type stored in the storage area and each electronic product identifier being adapted to receive a polling signal and to generate a responsive electromagnetic signal containing information from which at least the product type of the product can be determined;
an electromagnetic sensing circuit having at least one transmitter for transmitting polling electromagnetic fields into the storage area proximate to the products so that the electronic product identifier associated with each product can generate the responsive electromagnetic signal, with the electromagnetic sensing circuit further comprising at least one receiver having at least two sensing locations, wherein the receiver is configured so that each responsive electromagnetic signal is received at two or more sensing locations;
a location circuit for using the electromagnetic signals received to determine a location for each product in the storage area;
a data interface adapted to determine product information for each product type detected based upon signals received from the product identifiers;
a communication circuit adapted to transmit signals having product and location information;
a storage area data source for storing permanent previously assembled configuration data associating each storage area and its sensing circuit with a physical location;
a central processor operable to assemble a plan-o-gram indicating the physical arrangement of products in each storage area based upon transmitted product information, transmitted location information and configuration data and to store the plan-o-gram in the form of plan-o- gram data in a plan-o-gram data source that stores the information for the location of the products within a given storage area; and a user interface adapted to allowing the presentation of information from the stored plan-O-gram data source.

2. The system of claim 1, wherein a plurality of storage areas are arranged in a storage facility and wherein a group display is provided at a location proximate to but separated from a group of the storage areas, said group display having a group display receiver for receiving signals from the central processor and a group display driver for causing a display surface to present group display information provided by the central processor with the central processor providing the group display information based upon the product information and location information received from each electromagnetic sensing circuit.

3. The system of claim 2, wherein the central processor is adapted to determine product groupings based upon the product information associated with storage areas proximate to, but separate from, the group display and to provide group display information indicating each determined product grouping.

4. The system of claim 1, wherein a plurality of storage areas are arranged in a storage facility and wherein a group display is provided at a location proximate to but separated from a group of the storage areas, said group display having a receiver receiving transmitted signals having product information and location information, a group display processor for determining group display information based upon the product information and location information and a group display driver for causing the presentation of group display information on a display surface.

5. The system of claim 1, wherein said storage area data source further has data stored therein that associates each storage area with an arrangement of at least one product type assigned for storage in the storage area and wherein the central processor uses the product information and location information to determine whether the products actually located in the storage area correspond to the at least one product type assigned for storage in the storage area.

6. The system of claim 5, wherein said storage area data source further has data stored therein that associates portions of each storage area with one of the at least one product type and wherein the central processor is adapted to use the product information and location information to determine whether each assigned product type has the assigned product type stored in the portion of the storage area assigned therefore for the product type.

7. The system of claim 5, wherein said user interface is operable to receive a reset command and to cause said central processor to reset so that the central processor causes data to be stored in said storage area data source that associates each storage area with an arrangement of at least one product type assigned for storage in the storage area in accordance with the actual arrangement of the at least one product type at the time that the reset command is received.

8. The system of claim 1, further comprising a display at each storage area and a display controller adapted to cause the display to present product information, wherein said communication circuit is further adapted to receive product information from the central processor with the central processor providing product information for each display based upon the transmitted product information and location information for products located at the storage area proximate to the display.

9. A plan-o-gram generating system for use with a storage facility having an arrangement of storage areas, each storage area capable of storing more than one product, each product having an electronic product identifier capable of generating an electromagnetic field having data from which at least a product type of the product can be determined and each storage area being associated with a control circuit having a sensing circuit for sensing electromagnetic fields generated by the electronic product identifiers and for determining product and location information therefrom and a communication circuit for transmitting product information and location information; the system comprising:

a receiver having at least two sensing locations and adapted to receive the transmitted product and location information from each product identifier at two or more sensing locations;

a storage area data source for storing permanent previously assembled configuration data associating each storage area and an associated sensing circuit with a physical location in the storage facility;

a central processor operable to assemble a plan-o-gram indicating the physical arrangement of products in each storage area based upon the transmitted product information and location information and based upon the configuration data and to store the plan-o-gram in the form of plan-o-gram data in the storage area data source that stores the information for the location of products within the storage facility; and an output system for providing an output based upon the plan-o-gram data.

10. The plan-o-gram generating system of claim 9, wherein the output system generates a display providing a user with a displayable or printable map of the storage facility indicating the location of storage areas within the storage facility.

11. The plan-o-gram generating system of claim 9, wherein the output system generates a display providing a user with a displayable or printable map of the location of products in a storage facility.

12. The plan-o-gram generating system of claim 9, wherein the output system generates signals that cause displays located at the storage areas to provide product information.

13. The plan-o-gram generating system of claim 9, having a user input system adapted to receive a reset input and in response thereto the central processor stores data in the storage area data source that associates each storage area with an arrangement of at least one product type assigned for storage in the storage area, said association being made based upon the arrangement of product types at the time of the reset input as indicated by product and location information at that time.

14. The system of claim 9, wherein the central processor uses the product information and location information to determine whether the products actually located in the storage area correspond to the at least one product type assigned for storage in the storage area.

15. A method for determining plan-o-gram data comprising the steps of:

sensing identifiers associated with each of more than one product located in at least one storage area in a storage facility, wherein each identifier is sensed at two or more sensing locations;

determining a product type and product location of each product based upon the sensed identifiers;

determining a configuration of the at least one storage area in the storage facility;

determining a location of each product in the storage facility based upon the storage area configuration, the determined product locations and permanent previously assembled data associating each storage area with a physical location in the storage facility; and storing a plan-o-gram data indicating the location of products in the storage facility.

16. The method of claim 15, further comprising the step of determining which product types are assigned for storage in each storage area and providing an alert when products that are not assigned to a storage area are found within the storage area.

17. The method of claim 15, further comprising the step of receiving a reset signal and assigning products for storage in each storage area based upon the product types determined to be located in the storage area when the reset signal is received and storing data indicating the assignment of product types.

* * * * *